（12）United States Patent
Yoon et al.

(10) Patent No.: US 11,415,729 B2
(45) Date of Patent: Aug. 16, 2022

(54) REACTIVE MULTIFOCAL OPTICAL SYSTEM AND AUGMENTED REALITY DEVICE USING THE SAME

(71) Applicant: KOREA PHOTONICS TECHNOLOGY INSTITUTE, Gwangju (KR)

(72) Inventors: Seonkyu Yoon, Gwangju (KR); Dongkil Lee, Gwangju (KR); Kwanghoon Lee, Anyang-si (KR); Yanggyu Kim, Gwangju (KR)

( * ) Notice: Subject to any disclaimer, the term of this patent is extended or adjusted under 35 U.S.C. 154(b) by 293 days.

(21) Appl. No.: 16/586,978

(22) Filed: Sep. 28, 2019

(65) Prior Publication Data

US 2020/0209443 A1 Jul. 2, 2020

(51) Int. Cl.

| | |
|---|---|
| *G02B 27/14* | (2006.01) |
| *G02B 5/08* | (2006.01) |
| *G06T 7/571* | (2017.01) |
| *G02B 5/30* | (2006.01) |
| *G02B 27/01* | (2006.01) |
| *G02B 27/40* | (2006.01) |
| *G06F 3/01* | (2006.01) |
| *G06V 20/20* | (2022.01) |

(52) U.S. Cl.
CPC ........... *G02B 5/0866* (2013.01); *G02B 5/305* (2013.01); *G02B 27/0172* (2013.01); *G02B 27/40* (2013.01); *G06F 3/011* (2013.01); *G06T 7/571* (2017.01); *G06V 20/20* (2022.01); *G02B 2027/0178* (2013.01)

(58) Field of Classification Search
CPC .. G02B 5/0866; G02B 5/305; G02B 27/0172; G02B 27/40; G02B 2027/0178; G06T 7/571; G06F 3/011; G06K 9/00671

USPC ............................... 359/629, 630, 638, 639
See application file for complete search history.

(56) References Cited

FOREIGN PATENT DOCUMENTS

| JP | 06138432 A | * | 5/1994 |
|---|---|---|---|
| JP | 2005-528655 | | 9/2005 |
| JP | 2014-530389 | | 11/2014 |

(Continued)

OTHER PUBLICATIONS

English Specification of 2018-060208.

(Continued)

*Primary Examiner* — William Choi
(74) *Attorney, Agent, or Firm* — Antonio Ha & U.S. Patent, LLC (57) ABSTRACT

A multi-focal optical device comprises an image output unit outputting optical information, a linear polarizer uni-directionally polarizing the optical information, a first light reflector including a first polarizer transmitting light only in a first direction and reflecting the light transmitted through the first polarizer, a second light reflector including a second polarizer transmitting light only in a second direction perpendicular to the first direction and reflecting the light transmitted through the second polarizer, a light splitter splitting the optical information transmitted through the linear polarizer into the first light reflector and the second light reflector and reflecting the optical information reflected by one of the first light reflector or the second light reflector to allow the reflected optical information to form one focus, and a controller configured to control the linear polarizer to vary a direction of polarization of the linear polarizer.

10 Claims, 9 Drawing Sheets

(56) References Cited

FOREIGN PATENT DOCUMENTS

| | | |
|---|---|---|
| JP | 2018-060208 | 4/2018 |
| KR | 10-2016-0113089 | 9/2016 |
| KR | 10-1866683 | 6/2018 |
| KR | 10-2018-0086798 | 8/2018 |

OTHER PUBLICATIONS

English Specification of 2014-530389.
English Specification of 10-2016-0113089.
English Specification of 10-1866683.
English Specification of 2005-528655.
English Specification of 10-2018-0086798.

* cited by examiner

REACTIVE MULTIFOCAL OPTICAL SYSTEM AND AUGMENTED REALITY DEVICE USING THE SAME

CROSS-REFERENCE TO RELATED APPLICATION(S)

This application is based on and claims priority under 35 U.S.C. 119 to Korean Patent Application No. 10-2018-0172200, filed on Dec. 28, 2018, in the Korean Intellectual Property Office, the disclosure of which is herein incorporated by reference in its entirety.

TECHNICAL FIELD

Embodiments of the disclosure relate to a reactive multifocal optical system and augmented reality devices using the same.

DESCRIPTION OF RELATED ART

The description of the Discussion of Related Art section merely provides information that may be relevant to embodiments of the disclosure but should not be appreciated as necessarily constituting the prior art.

Augmented reality (AR) may refer to technology of mixing real-world information and virtual images by adding virtual information images to a real-world environment.

Real-world information may contain information unnecessary for the user or lack information necessary for the user. AR systems mix the real world and a virtual world to thereby provide the user with real-time interaction between the real world and necessary information.

An AR device includes a multi-focal optical system to produce virtual information or three-dimensional (3D) images. The multi-focal optical system refers to a device to produce images with different focuses. Conventionally, the multi-focal optical system produces images of different focuses by varying the distances between the optical system and the image output devices. One of the image output devices emits light to form a virtual image in a predetermined position, and the other emits light using an additional component (e.g., a mirror) to vary the distance to the optical system, thereby forming another virtual image in a different position.

However, by its nature of adjusting the distance between the image output device and the optical system to vary the image forming distance between multiple images produced, the conventional optical system may raise some issues with configuration when the image output devices are repositioned. For example, a repositioning of the image output devices may require resizing of the multi-focal optical system and hence redesigning. Further, the need for being equipped with multiple image output devices and multiple optical systems may cause the multi-focal optical system to be bulkier and more expensive.

The growth of augmented reality technology leads to the demand for providing such an effect as if virtual 3D images gradually zoom in or out beyond simply mixing and outputting virtual 3D images with the real world. These effects require modification of image information about images with different focuses and thus have conventionally been implemented using AR devices equipped with multiple image output devices. AR devices with a single image output device cannot achieve such effects. AR devices capable of, e.g., changing the position of an image to be output to the user may suffer from their increased size and costs.

SUMMARY

According to an embodiment of the disclosure, there may be provided a multi-focal optical system capable of providing multi-focal images even with a single image output device and a method of producing multi-focal images using the same.

According to an embodiment of the disclosure, there may be provided a multi-focal optical system capable of fusion of multi-focal images and repositioning of the display screen to be provided to the user even with a single image output device and a method of producing multi-focal images using the same.

According to an embodiment of the disclosure, a multi-focal optical device comprises an image output unit outputting optical information, a linear polarizer uni-directionally polarizing the optical information, a first light reflector including a first polarizer transmitting light only in a first direction and reflecting the light transmitted through the first polarizer, a second light reflector including a second polarizer transmitting light only in a second direction perpendicular to the first direction and reflecting the light transmitted through the second polarizer, a light splitter splitting the optical information transmitted through the linear polarizer into the first light reflector and the second light reflector and reflecting the optical information reflected by one of the first light reflector or the second light reflector to allow the reflected optical information to form one focus, and a controller configured to control the linear polarizer to vary a direction of polarization of the linear polarizer.

At least one of the first light reflector or the second light reflector is implemented as a semi-transparent mirror.

The first light reflector and the second light reflector are formed of materials with different refractive indexes.

The first light reflector and the second light reflector are positioned away from the light splitter at different distances.

The light splitter forms two virtual images with different image forming distances by forming one focus.

According to an embodiment of the disclosure, a multi-focal optical device comprises an image output unit outputting optical information, a circular polarizer circular-polarizing the optical information, a first light reflector and a second light reflector reflecting incident light, a light splitter splitting the optical information transmitted through the circular polarizer into the first light reflector or the second light reflector depending on a direction of polarization and reflecting the optical information reflected by one of the first light reflector or the second light reflector to allow the reflected optical information to form one focus, and a controller configured to control the circular polarizer to vary the direction of polarization of the circular polarizer.

At least one of the first light reflector or the second light reflector is implemented as a semi-transparent mirror.

The first light reflector and the second light reflector are formed of materials with different refractive indexes.

The first light reflector and the second light reflector are positioned away from the light splitter at different distances.

The light splitter forms two virtual images with different image forming distances by forming one focus.

According to an embodiment of the disclosure, a multi-focal optical device comprises an image output unit outputting optical information, a first light reflector and a second light reflector reflecting incident light, a light splitter splitting the optical information into the first light reflector and the second light reflector and reflecting the optical information reflected by one of the first light reflector or the second light reflector to allow the reflected optical information to form one focus, and a polarizer configured to control a direction of polarization of the optical information to adjust a brightness of each piece of the optical information split to the first light reflector and the second light reflector by the light splitter.

According to the embodiments of the disclosure, multi-focal images may be produced even with a single image output device.

Also possible are the fusion of multi-focal images and the repositioning of the display screen to be provided to the user even with a single image output device.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure. Similar reference denotations are used to refer to similar elements throughout the drawings.

The terms "first" and "second" may be used to describe various components, but the components should not be limited by the terms. The terms are used only to distinguish one component from another. For example, a first component may be denoted a second component, and vice versa without departing from the scope of the disclosure. The term "and/or" may denote a combination(s) of a plurality of related items as listed or any of the items.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the disclosure. It is to be understood that the singular forms "a," "an," and "the" include plural references unless the context clearly dictates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
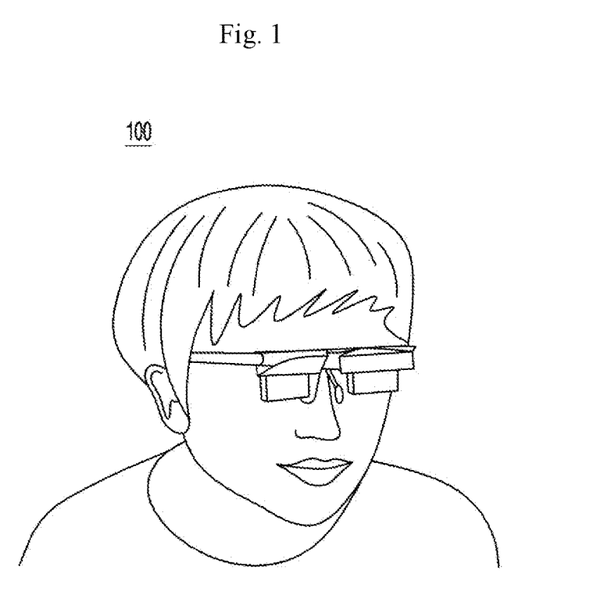
FIG. 1 is a view illustrating an AR device with a multi-focal optical system according to an embodiment of the disclosure.
Figure 2:
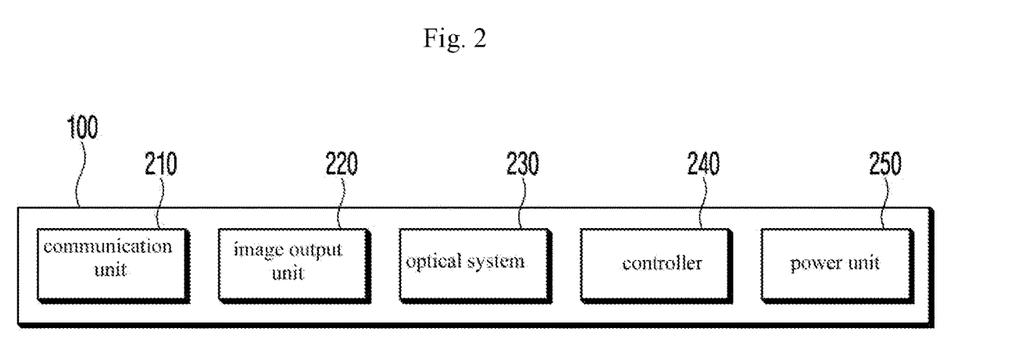
FIG. 2 is a block diagram illustrating an AR device according to an embodiment of the disclosure.

FIG. 1 is a view illustrating an AR device with a multi-focal optical system according to an embodiment of the disclosure. FIG. 2 is a block diagram illustrating an AR device according to an embodiment of the disclosure.

Referring to FIGS. 1 and 2, according to an embodiment of the disclosure, an augmented reality (AR) device 100 includes a communication unit 210, an image output unit 220, an optical system 230, a controller 240, and a power unit 250.

The communication unit 210 receives an image to be displayed from the outside. The communication unit 210 may perform wired or wireless communication and receive an image from an external device via wired or wireless communication. The communication unit 210 may be implemented as a physical connector, e.g., a universal serial bus (USB) terminal, and may receive an image from the external device via the physical connector.

The image output unit 220 outputs the received image. The image output unit 220 outputs light corresponding to the received image and outputs the image on an actual environment image. Thus, the user may perceive both the actual environment image and an AR image.

The optical system 230 receives optical information output from the image output unit 220 and generates a plurality of virtual images with different image forming distances. The optical system 230 is described below in greater detail with reference to FIGS. 3 to 10.

The controller 240 controls the components 210, 220, 230, and 250. The controller 240 may receive operation control signals for the components (e.g., to turn on or off the AR device 100 from the user of the AR device 100 and control the components to operate according to the operation control signals.

The power unit 250 provides power to the components 210 to 240 to operate the components 210 to 240.

The AR device 100 is a device that produces an AR image and outputs the AR image on an actual environment image and allows the user to view virtual information or three-dimensional (3D) images with one or both eyes despite using only one image output unit 220 and only one optical system 230. Since the AR device 100 produces a plurality of virtual images with different image forming distances using the image output unit 220 and the optical system 230, the user may view virtual image or 3D images even with one eye. The AR device 100 may control the optical system 230 to vary the position on the display screen where a fusion of a plurality of virtual images is to be provided to the user, thereby being able to provide more realistic AR images to the user.

Figure 3:
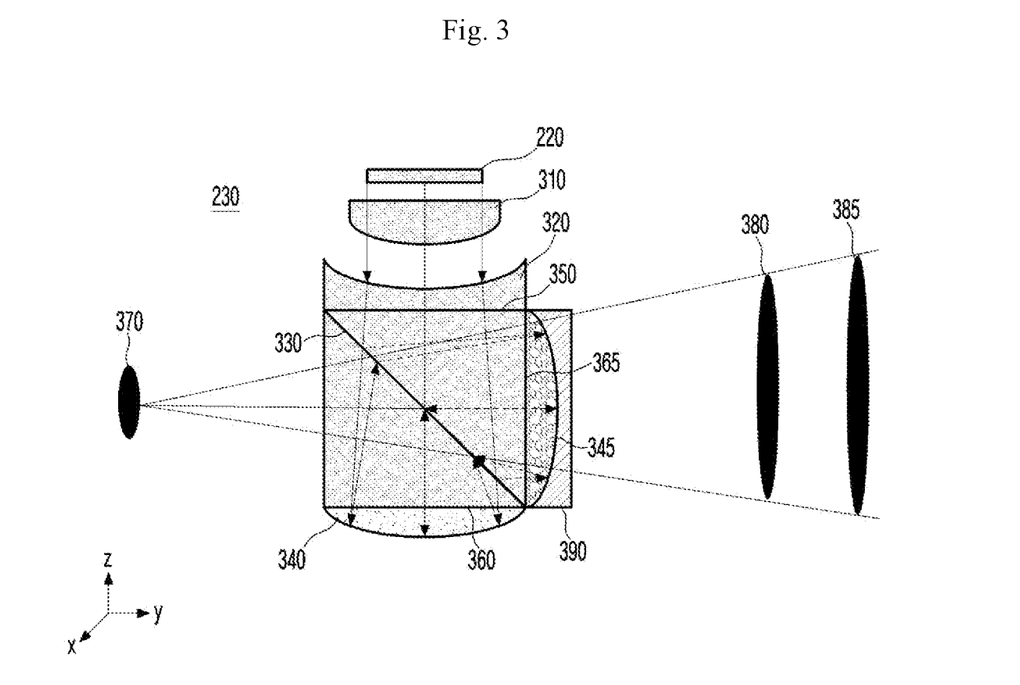
FIG. 3 is a view illustrating a configuration of an optical system according to a first embodiment of the disclosure.

FIG. 3 is a view illustrating a configuration of an optical system according to a first embodiment of the disclosure.

Referring to FIG. 3, the optical system 230 of the first embodiment includes a lens unit including a first lens 310 and a second lens 320, a light splitter 330, a first light reflector 340, a second light reflector 345, a linear polarizer 350, a first polarizer 360, and a second polarizer 365. The optical system 230 may further include an image distortion preventer 390.

The lens unit includes the first lens 310 and the second lens 320.

The lens unit is disposed along an optical axis along which optical information output from the image output unit 220 travels, receives optical information corresponding to an image from the image output unit 220, and refracts the received optical information (which may be light beams). The lens unit refracts the light beams to enable the light beams reflected by the first light reflector 340 and the second light reflector 345 to be collected to a preset focus 370 so that the user may observe virtual images 380 and 385 arranged in arbitrary distances.

The first lens 310 allows the optical information received from the image output unit 220 to have directivity. The first lens 310 may be implemented as a collimator and may form the optical information received from the image output unit 220 which is substantially a parallel beam. As the first lens 310 is disposed on the optical path (direction of −z axis) of the light output from the image output unit 220, the whole optical information output from the image output unit 220 may be incident onto the second lens 320. Unless the first lens 310 is disposed, the image output unit 220 may output the optical information to the xy plane without directivity (e.g., in random directions), thus causing the optical information to travel off the second lens 320. Where the optical information travels off the second lens 320, the amount of light incident onto the second lens 320 reduces, with the result of reduced optical efficiency. To address this issue, the optical system 230 includes the first lens 310 on the light path along which light output from the image output unit 220 travels.

The second lens 320 is disposed on the path of the light passing through the first lens 310 and disperses the optical information passing through the first lens 310. The second lens 320 may be implemented as a concave lens and disperses the optical information passing through the first lens 310. The optical information passing through the second lens 320 may be reflected by the first light reflector 340 and the second light reflector 345, wholly forming an image.

The light splitter 330 splits the optical information passing through the second lens 320 or re-reflects optical information reflected by the first light reflector 340 or the second light reflector 345.

The light splitter 330 branches the optical information passing through the second lens 320 into the first light reflector 340 and the second light reflector 345. The light splitter 330 may be implemented as, e.g., a beam splitter to split a portion of the optical information passing through the second lens 320 to the first light reflector 340 and the rest of the optical information to the second light reflector 345.

The light splitter 330 re-reflects the optical information reflected by the first light reflector 340 or the second light reflector 345. The light splitter 330 re-reflects the optical information reflected by the light reflector (the second light reflector 345 in the example shown in FIG. 3), which is not the one disposed on the optical axis where the focus 370 and two virtual images 380 and 385 are formed, towards the focus 370. Because of the need for providing the actual environment image to the user along the optical axis and allowing the optical information reflected by the light reflectors to form one focus 370, the light splitter 330 transmits the optical information reflected by the light reflector disposed on the optical axis.

The reflectors 340 and 345 reflect the optical information branched from the light splitter 330. The light reflectors 340 and 345 include a material with a predetermined refractive index and a reflecting surface to reflect optical information. The light reflectors 340 and 345 re-reflect the pieces of optical information split into by the light splitter 330 back to the light splitter 330, allowing each piece of optical information to form one focus 370 on one side of the optical system 230. The light reflectors 340 and 345 may be formed of materials with different refractive indexes. Thus, the pieces of optical information split into are reflected by the light reflectors 340 and 345 in different times and thus form the two virtual images 380 and 385 with different image forming distances. The user may view the two virtual images 380 and 385 even with one eye, thus being able to view 3D images (AR images) with minimized eye fatigue. The positions of the two virtual images 380 and 385 formed may vary depending on the curvature of the reflecting surfaces or the refractive index of the materials of the light reflectors 340 and 345.

The light reflector (e.g., the second light reflector 345) disposed along the optical axis where the focus 370 and the two virtual images 380 and 385 are formed may be implemented as a semi-transparent mirror capable of reflecting a portion of the light while transmitting the rest. The user needs to view the actual environment image beyond the second light reflector 345 and the display surface where the two virtual images 380 and 385, which are produced together with the actual environment image in the direction along which the actual environment image is viewed, are fused and provided to the user. Thus, at least the light reflector disposed on the optical axis may be implemented as a semi-transparent mirror.

Figure 5:
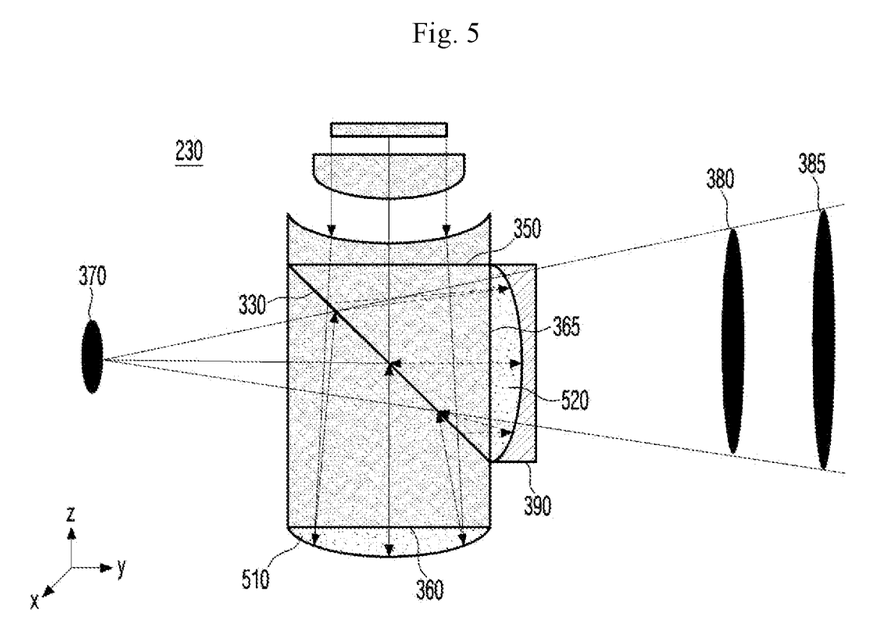
FIG. 5 is a view illustrating a configuration of an optical system according to a third embodiment of the disclosure.

The linear polarizer 350 uni-directionally polarizes optical information, which is transmitted through the second lens 320 and incident onto the light splitter 330 between the second lens 320 and the light splitter 330. The linear polarizer 350 may change the direction in which the optical information is polarized under the control of a controller (e.g., the controller 240). As the direction of polarization varies, the linear polarizer 350 may adjust the amount of light (e.g., brightness) of the optical information passing through the first polarizer 360 and the second polarizer 365. As the brightness of the optical information is adjusted by the linear polarizer 350, the brightness of each virtual image 380 and 385 formed by the optical information is adjusted. The position of the display surface where the two virtual images 380 and 385 are fused and provided to the user is varied depending on the brightness of each virtual image 380 and 385. For example, where the direction of polarization puts the first virtual image 380 in the maximum brightness and the second virtual image 385 in the minimum brightness, the user may perceive as if a 3D image is provided in the position of the first virtual image 380. In contrast, where the direction of polarization puts the first virtual image 380 in the minimum brightness and the second virtual image 385 in the maximum brightness, the user may perceive as if a 3D image is provided in the position of the second virtual image 385. As another example, where the direction of polarization puts the first virtual image 380 and the second virtual image 385 in the same brightness, the user may perceive as if a 3D image is provided in the middle between the first virtual image 380 and the second virtual image 385. The linear polarizer 350 may vary the direction of polarization under the control of a controller (e.g., the controller 240), thereby repositioning the display surface to be provided to the user even with only one image output unit 220 and providing such an effect as if the position of the display surface to be provided to the user gradually varies. FIGS. 3 and 5 illustrate an example in which the linear polarizer 350 is disposed between the second lens 320 and the light splitter 330, but embodiments of the disclosure are not limited thereto. Alternatively, the linear polarizer 350 may be positioned anywhere between the image output unit 220 and the light splitter 330.

The first polarizer 360 and the second polarizer 365, respectively, are disposed between the light splitter 330 and the first light reflector 340 and between the light splitter 330 and the second light reflector 345 and uni-directionally polarize the optical information split by the second polarizer 365 into the light reflectors 340 and 345. The first polarizer 360 and the second polarizer 365 polarize the optical information in directions perpendicular to each other. Thus, the optical information polarized in one direction by the linear polarizer 350 is adjusted for brightness while passing through the first polarizer 360 and the second polarizer 365. For example, where the optical information is polarized by the linear polarizer 350 in the same direction as the direction of polarization of the first polarizer 360, the optical information split into the first polarizer 360 may remain unchanged in the maximum brightness although passing through the first polarizer 360, but the optical information split into the second polarizer 365 may be rendered in the minimum brightness or blocked off while passing through the second polarizer 365. As such, as the brightness of the optical information passing through the first polarizer 360 and the second polarizer 365 is varied depending on the direction of the linear polarizer 350, the brightness of the virtual image formed by each piece of optical information split into is varied as well. Since the brightness of each virtual image is varied independently, the position of the display surface to be provided to the user may be varied. Since the position of the display surface to be provided to the user is varied using the polarizers 350, 360, and 365, the variation in the position of the display surface may be achieved even with only one image output unit 220 and only one optical system 230.

The optical system 230 may further include an image distortion preventer 390. The image distortion preventer 390 prevents distortion of the actual environment image, which the user observes, by the refractive index and curvature of the second light reflector 345. For users with normal vision, the image distortion preventer 390 may be configured with the same refractive index as the second light reflector 345 and the negative curvature of the second light reflector 345. For users with myopia, hyperopia, or astigmatism, the image distortion preventer 390 may be configured with a refractive index and curvature for providing a vision to correct a distortion of the actual environment image and vision.

Figure 4:
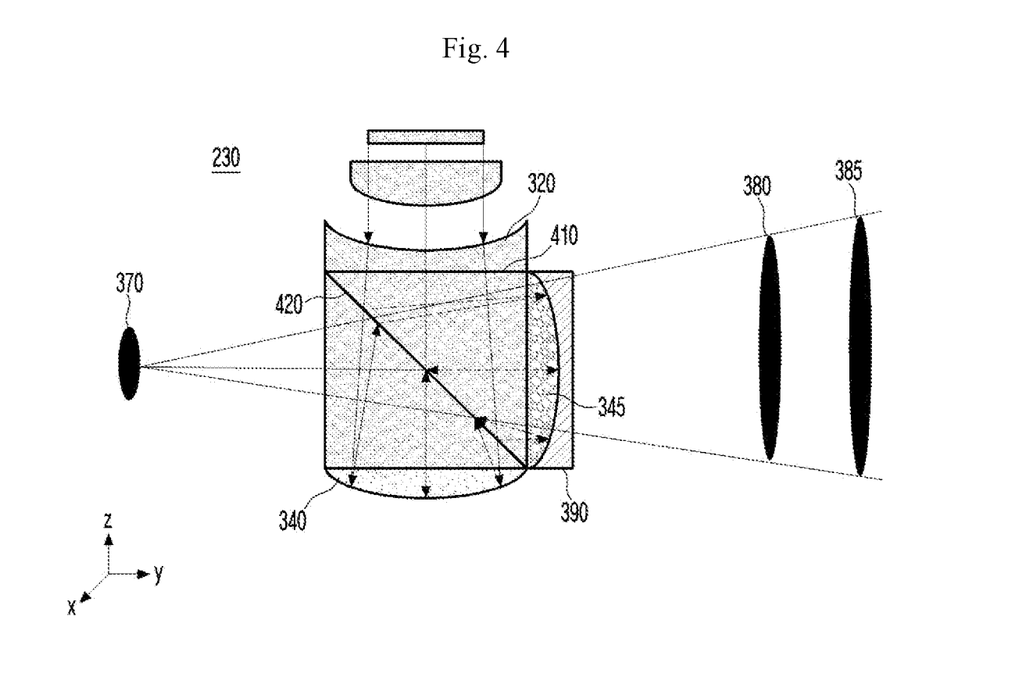
FIG. 4 is a view illustrating a configuration of an optical system according to a second embodiment of the disclosure.

FIG. 4 is a view illustrating a configuration of an optical system according to a second embodiment of the disclosure.

Referring to FIG. 4, an optical system 230 includes a circular polarizer 410, instead of the linear polarizer 350, and a polarization splitter 420, instead of the light splitter 330, as compared with the first embodiment.

Figure 6:
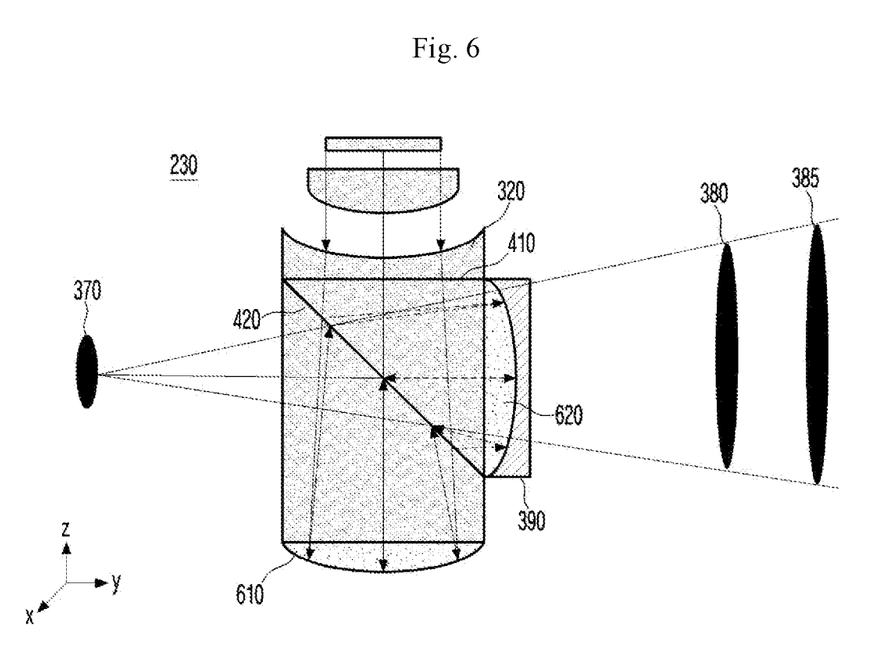
FIG. 6 is a view illustrating a configuration of an optical system according to a fourth embodiment of the disclosure.

The circular polarizer 410 polarizes, like the linear polarizer 350 but circularly, optical information, which is transmitted through the second lens 320 and incident onto the light splitter 330 between the second lens 320 and the light splitter 330. Unlike the linear polarizer 350, the circular polarizer 410 polarizes the optical information not unidirectionally but circularly. The controller (e.g., the controller 240) controls the circular polarizer 410 to adjust the magnitude of each component (S Pol and P Pol) of optical information circular-polarized. As the magnitude of each component is adjusted by the circular polarizer 410, the brightness of each virtual image 380 and 385 generated by the optical information split may be varied. FIGS. 4 and 6 illustrate an example in which the circular polarizer 410 is disposed between the second lens 320 and the light splitter 330, but embodiments of the disclosure are not limited thereto. Alternatively, the circular polarizer 350 may be positioned anywhere between the image output unit 220 and the light splitter 330.

Like the light splitter 330, the polarization splitter 420 splits the optical information passing through the second lens 320 or re-reflects optical information reflected by the first light reflector 340 or the second light reflector 345. However, the polarization splitter 420 splits the optical information passing through the second lens 320 in different directions depending on the direction of polarization. Accordingly, the optical information circular-polarized by the circular polarizer 410 may be split in the same or a different quantity depending on the magnitude of each component (S Pol and P Pol). The polarization splitter 420 may be implemented in any configuration as long as it may vary the magnitude of optical information split depending on the direction of polarization as does a polarized beam splitter.

A controller (e.g., the controller 240) may control the circular polarizer 410 to adjust the magnitude of each piece of information split by the polarization splitter 420 and to adjust the brightness of each virtual image 380 and 385 generated. Thus, the optical system 230 of the second embodiment may likewise vary the position of the display screen which is to be provided to the user.

Since the optical system 230 of the second embodiment splits light with the circular polarizer 410 and the polarization splitter 420, the optical system 230 may generate two virtual images with different image forming distances even with one image output unit 220 and one optical system 230 and may adjust the brightness of each of the two virtual images generated, even without any additional polarizer.

FIG. 5 is a view illustrating a configuration of an optical system according to a third embodiment of the disclosure.

Referring to FIG. 5, the optical system 230 of the third embodiment has substantially the same components as the optical system 230 of the first embodiment except for the first and second light reflectors.

Unlike the first and second light reflectors 340 and 345 in the optical system 230 of the first embodiment, a first light reflector 510 and a second light reflector 520 need not necessarily be formed of materials with different refractive indexes but may rather be formed of materials with the same refractive index. The first light reflector 510 and the second light reflector 520 may be positioned away from the light splitter 330 at different distances. Since the light reflectors 510 and 520 are positioned away from the light splitter 330 at different distances, the times when the light beams split by the light splitter 330 are incident onto the light reflectors 510 and 520 may differ from each other or the times when the light beams are reflected by the light reflectors 510 and 520 and transmitted through or reflected by the light splitter 330 may differ from each other. Thus, the pieces of optical information split by the light splitter 330 form two virtual images 380 and 385 with different image forming distances. The optical system 230 of the third embodiment forms two virtual images by forming a path difference between the pieces of optical information split and thus may likewise form two virtual images even with one image output unit 220 and one optical system 230.

Since the optical system 230 of the third embodiment also includes a linear polarizer 350 and first and second polarizers 360 and 365 like the optical system of the first embodiment, the optical system 230 of the third embodiment may adjust the brightness of each of the two virtual images.

FIG. 6 is a view illustrating a configuration of an optical system according to a fourth embodiment of the disclosure.

Referring to FIG. 6, the optical system 230 of the fourth embodiment has substantially the same components as the optical system 230 of the first embodiment except for the first and second reflectors.

A first light reflector 610 and a second light reflector 620 may be formed of materials with the same or different refractive indexes like the first light reflector 510 and the second light reflector 520 of the third embodiment. The first light reflector 610 and the second light reflector 620 may be positioned away from the light splitter 330 at different distances. Thus, two virtual images are formed by forming a path difference between split pieces of optical information.

Since the optical system 230 of the fourth embodiment also includes a circular polarizer 410 and a polarization splitter 420 like the optical system of the second embodiment, the optical system 230 of the fourth embodiment may adjust the brightness of each of the two virtual images.

Figure 7:
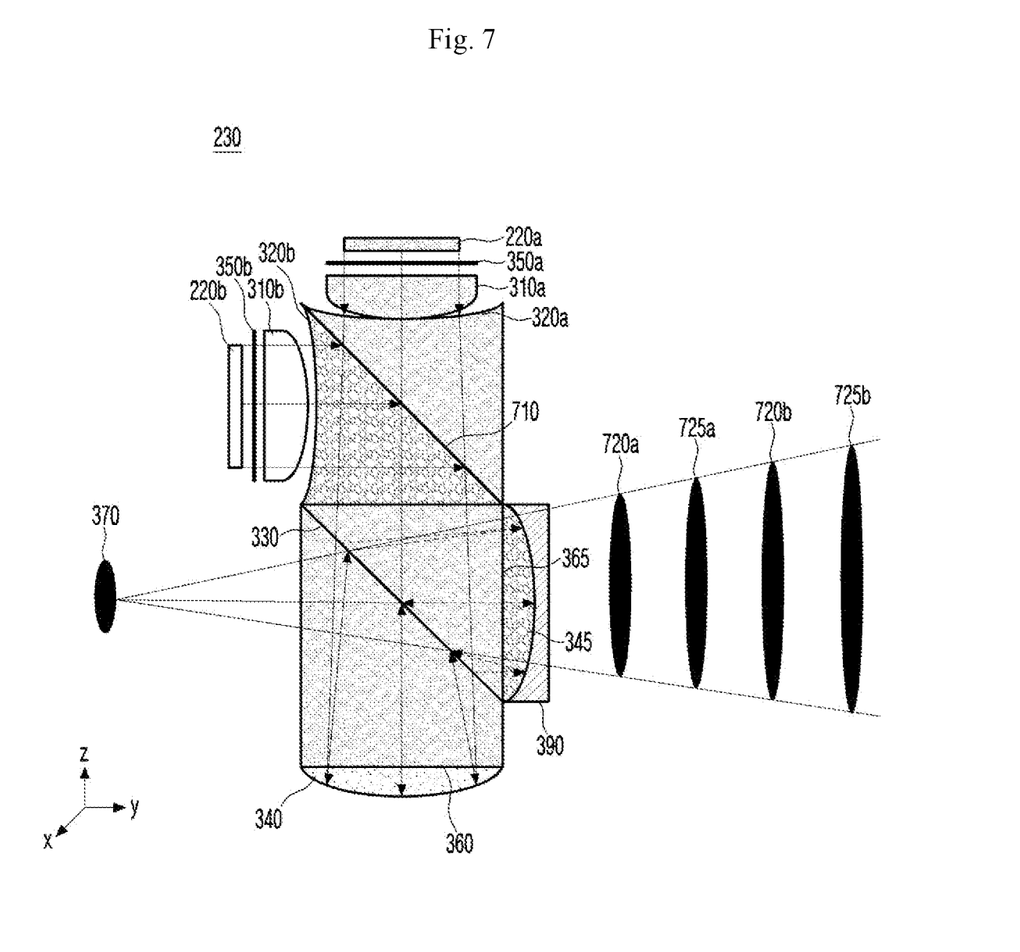
FIG. 7 is a view illustrating a configuration of an optical system according to a fifth embodiment of the disclosure.

FIG. 7 is a view illustrating a configuration of an optical system according to a fifth embodiment of the disclosure.

Referring to FIG. 7, the optical system 230 of the fifth embodiment further includes an additional image output unit 220, an additional first lens 310b, an additional second lens 320b, an additional linear polarizer 350b, and a second light splitter 710.

The second light splitter 710 transmits the light beam, which has passed through the second lens 320a, and reflects the light beam, which has passed through the second lens 320b. The light beam, which is transmitted through the second lens 320a and is incident in the direction of −z axis, passes through the second light splitter 710. The light beam, which is transmitted through the second lens 320b and incident in the direction of +y axis with respect to the second light splitter 710, is reflected by the second light splitter 710 in the direction of −z axis. Thus, the two light beams incident onto the second light splitter 710 in different directions are rendered to travel in the same direction by the second light splitter 710.

The light beams reflected by or transmitted through the second light splitter 710 pass through the light splitter 330, the first light reflector 340, the second light reflector 345, the first polarizer 360, and the second polarizer 365, forming two virtual images 720a and 725a or 720b and 725b. Although FIG. 7 illustrates that the virtual images are formed in different positions, the virtual image 725a and the virtual image 720b may be formed in the same position depending on the wavelength of light emitted from the image output unit or the curvature or refractive index of the light reflectors 340 and 345.

A controller (e.g., the controller 240) controls the output of each image output unit 220a and 220b or the direction of polarization of the linear polarizer 350a or 350b to vary the position of the display surface which is to be provided to the user.

The controller (e.g., the controller 240) controls the output of each image output unit 220a and 220b along with the direction of polarization of the linear polarizer 350a or 350b to vary the position of the display surface to be provided to the user. Where the controller (e.g., the controller 240) controls the image output units so that only the image output unit 220a is operated, the position of the display screen to be provided to the user is varied between the two virtual images 720a and 725a depending on the direction of polarization of the linear polarizer 350a. Where the controller (e.g., the controller 240) controls the image output units so that only the image output unit 220b is operated, the position of the display screen to be provided to the user is varied between the two virtual images 720b and 725b depending on the direction of polarization of the linear polarizer 350a. Where the controller (e.g., the controller 240) controls the image output units so that both the image output units 220a and 220b are operated, the position of the display screen to be provided to the user is varied between the two virtual images 725a and 720b depending on the direction of polarization of the linear polarizer 350a.

As such, where a plurality of image output units are included in the optical system, the display screen to be provided to the user may be rendered to have a larger depth than where only one image output unit is included in the optical system.

Figure 8:
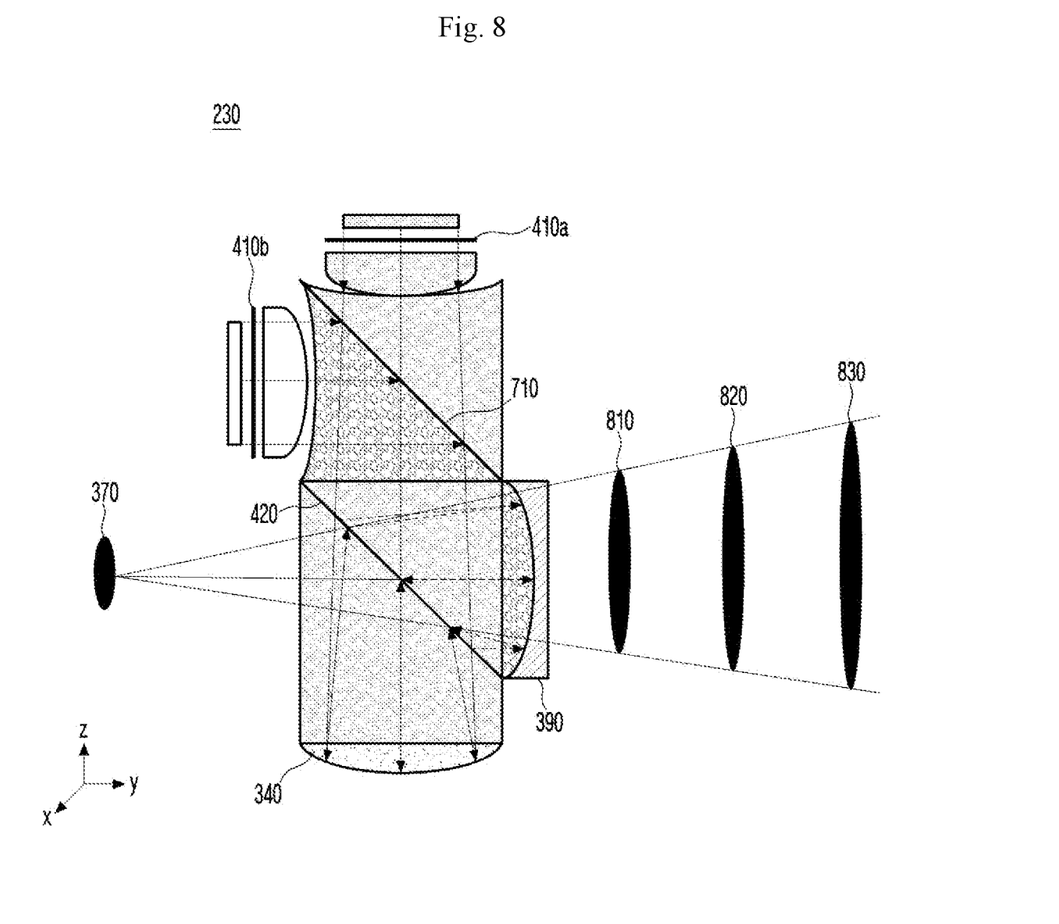
FIG. 8 is a view illustrating a configuration of an optical system according to a sixth embodiment of the disclosure.

FIG. 8 is a view illustrating a configuration of an optical system according to a sixth embodiment of the disclosure.

Referring to FIG. 8, the optical system 230 of the sixth embodiment includes circular polarizers 410a and 410b, instead of the linear polarizers 350a and 350b, and a polarization splitter 420, instead of the light splitter 330.

The optical system 230 of the sixth embodiment includes the circular polarizers 410a and 410b and the polarization splitter 420, thereby forming two virtual images using light emitted from each image output unit. Although FIG. 8 illustrates that some 820 of the virtual images formed by the image output units are in the same position, embodiments of the disclosure are not limited thereto. Alternatively, the virtual images formed by the image output units may be in different positions.

The optical system 230 of the sixth embodiment includes a plurality of image output units and may thus provide a larger depth of the display screen to be provided to the user than when the optical system includes only one image output unit.

Figure 9:
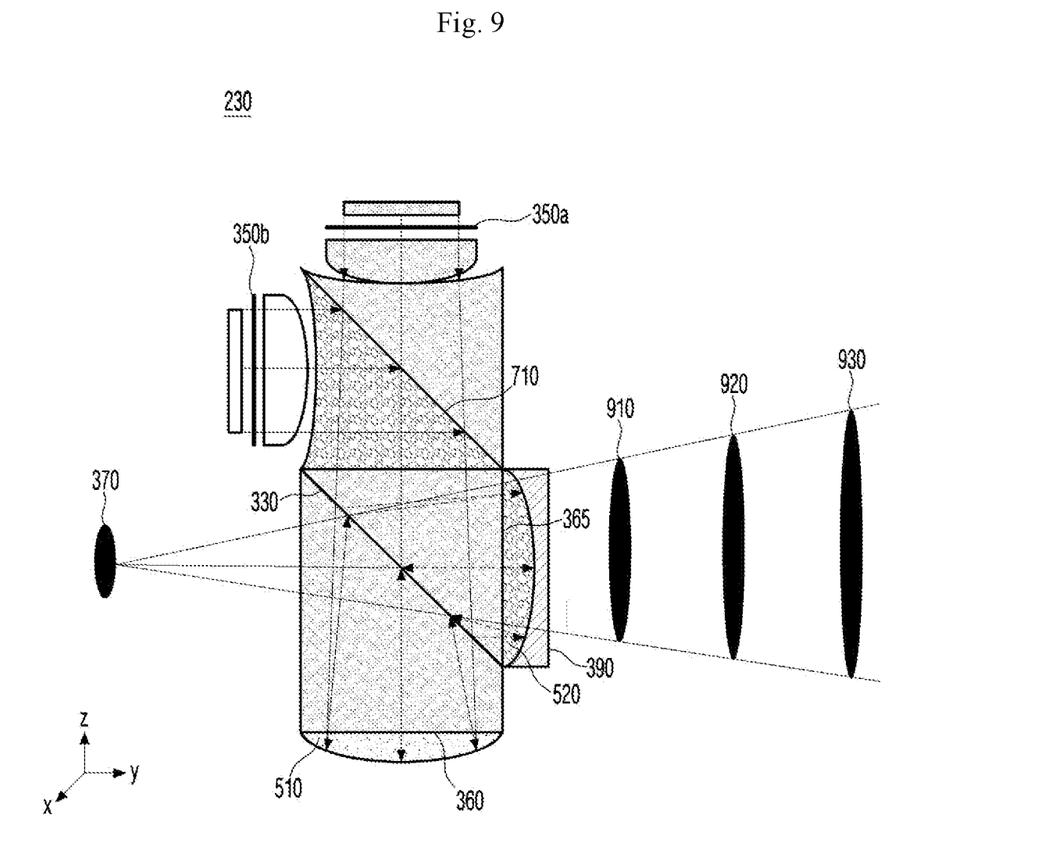
FIG. 9 is a view illustrating a configuration of an optical system according to a seventh embodiment of the disclosure.

FIG. 9 is a view illustrating a configuration of an optical system according to a seventh embodiment of the disclosure.

Referring to FIG. 9, the optical system 230 of the seventh embodiment has substantially the same components as the optical system 230 of the fifth embodiment except for the first and second light reflectors.

The first light reflector 510 and the second light reflector 520 may be positioned away from the light splitter 330 at different distances and be formed of materials with the same or different refractive indexes. Thus, the optical system 230 of the seventh embodiment may form two virtual images using light emitted from each image output unit.

The optical system 230 of the seventh embodiment includes a plurality of image output units and may thus provide a larger depth of the display screen to be provided to the user than when the optical system includes only one image output unit.

Figure 10:
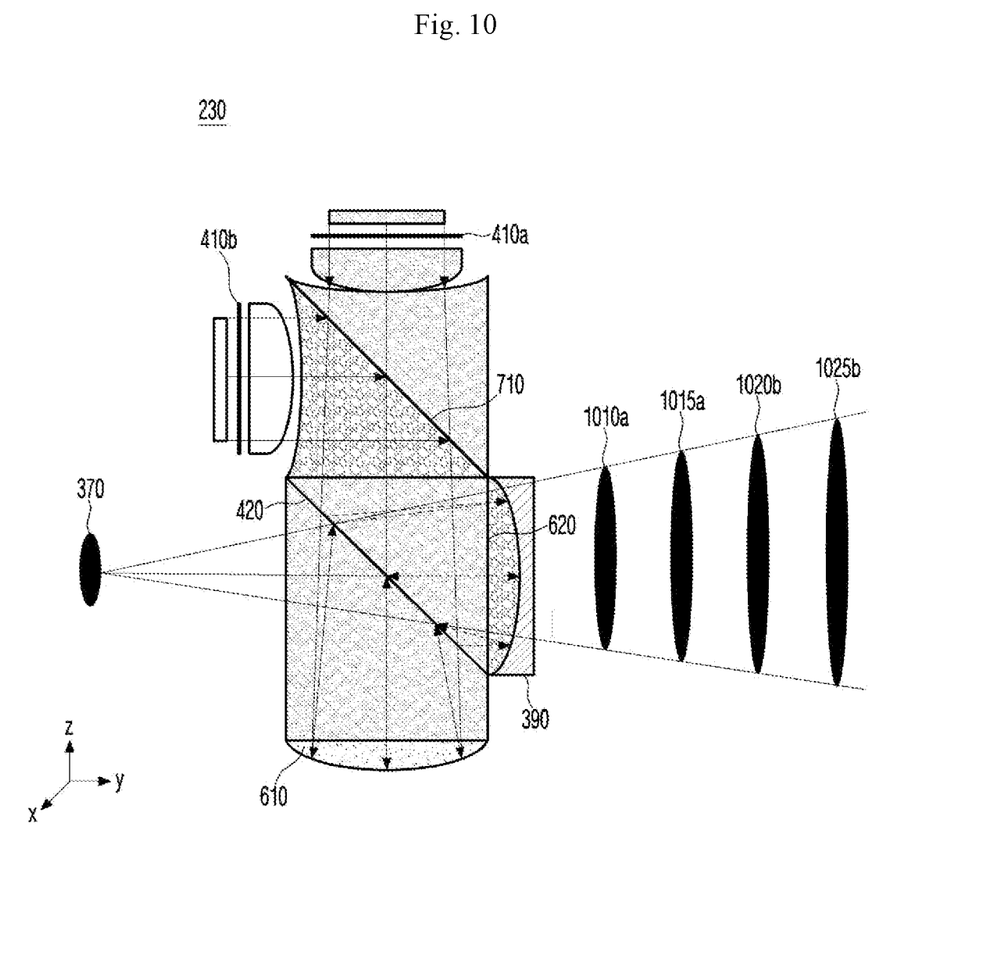
FIG. 10 is a view illustrating a configuration of an optical system according to an eighth embodiment of the disclosure.

FIG. 10 is a view illustrating a configuration of an optical system according to an eighth embodiment of the disclosure.

Referring to FIG. 10, the optical system 230 of the eighth embodiment has substantially the same components as the optical system 230 of the sixth embodiment except for the first and second light reflectors.

The first light reflector 610 and the second light reflector 620 may be positioned away from the light splitter 330 at different distances and be formed of materials with the same or different refractive indexes. Thus, the optical system 230 of the eighth embodiment may form two virtual images using light emitted from each image output unit.

The optical system 230 of the eighth embodiment includes a plurality of image output units and may thus provide a larger depth of the display screen to be provided to the user than when the optical system includes only one image output unit.

Figure 11:
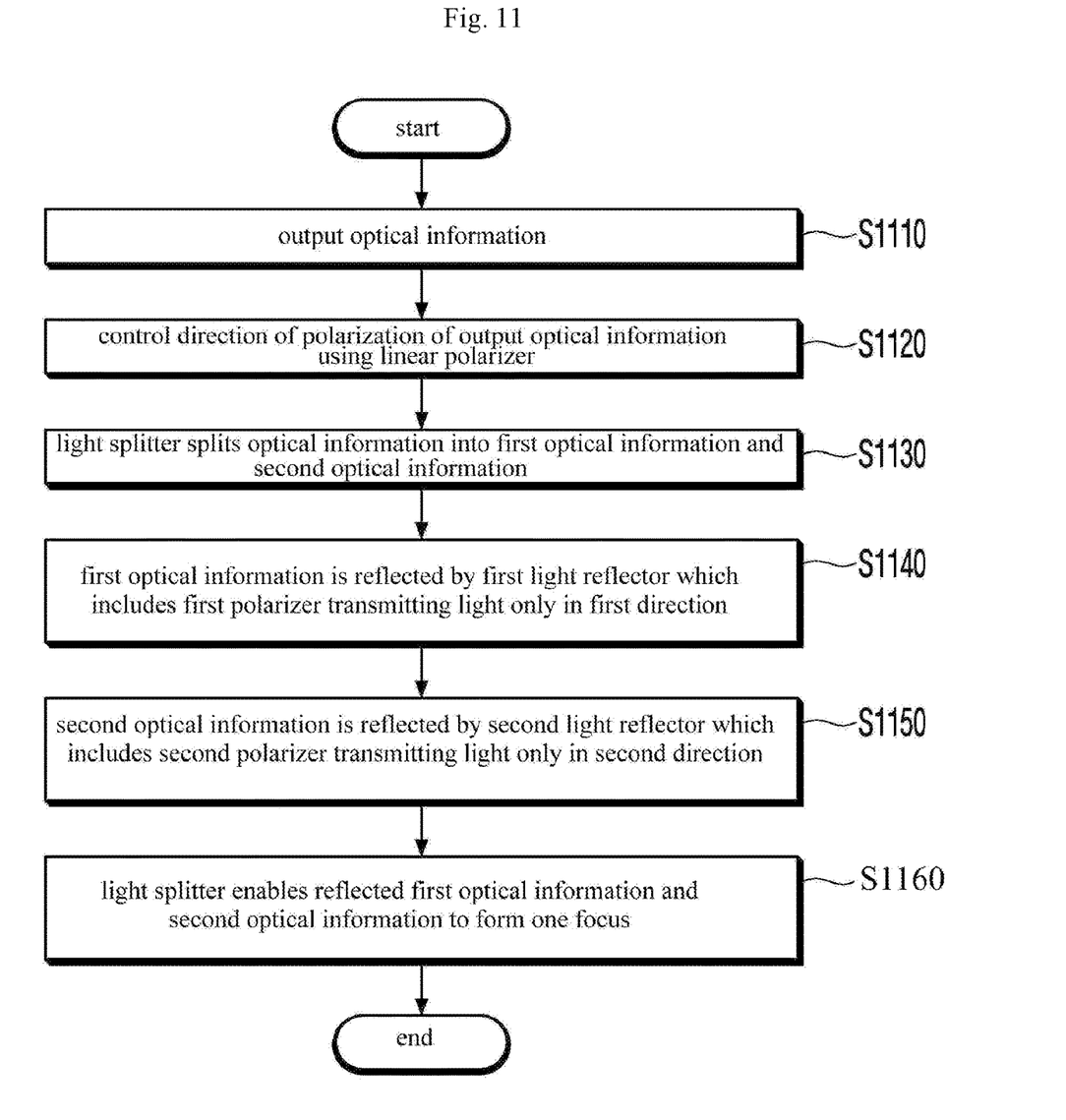
FIG. 11 is a flowchart illustrating a method of producing a multi-focal image by an optical system according to the first embodiment of the disclosure.

FIG. 11 is a flowchart illustrating a method of producing a multi-focal image by an optical system according to the first embodiment of the disclosure.

The image output unit 220 outputs optical information (S1110).

A controller (e.g., the controller 240) controls the direction of polarization of the output optical information using the linear polarizer 350 (S1120).

The optical information is split into first optical information and second optical information by the light splitter 330 (S1130).

The first optical information is reflected by the first light reflector 340 which includes the first polarizer 360 transmitting light only in a first direction (S1140). The first optical information split to the first reflector 340 is incident via the first polarizer 360, which transmits light only in the first direction, onto the first light reflector 340 and reflected by the first light reflector 340. The first optical information rendered to have one direction of polarization by the linear polarizer 350 is controlled for its brightness depending on the direction of polarization of the first polarizer.

The second optical information is reflected by the second light reflector 345 which includes the second polarizer 365 transmitting light only in a second direction (S1150). The second optical information split to the second reflector 345 is incident via the second polarizer 365, which transmits light only in the second direction, onto the second light reflector 345 and reflected by the second light reflector 345. The second optical information rendered to have one direction of polarization by the linear polarizer 350 is controlled for its brightness depending on the direction of polarization of the second polarizer. The materials of the light reflectors 340 and 345 may have different refractive indexes, and the distances between the light splitter 330 and the light reflectors 340 and 345 may differ from each other.

The light splitter 330 enables the reflected first optical information and second optical information to form one focus (S1160).

Figure 12:
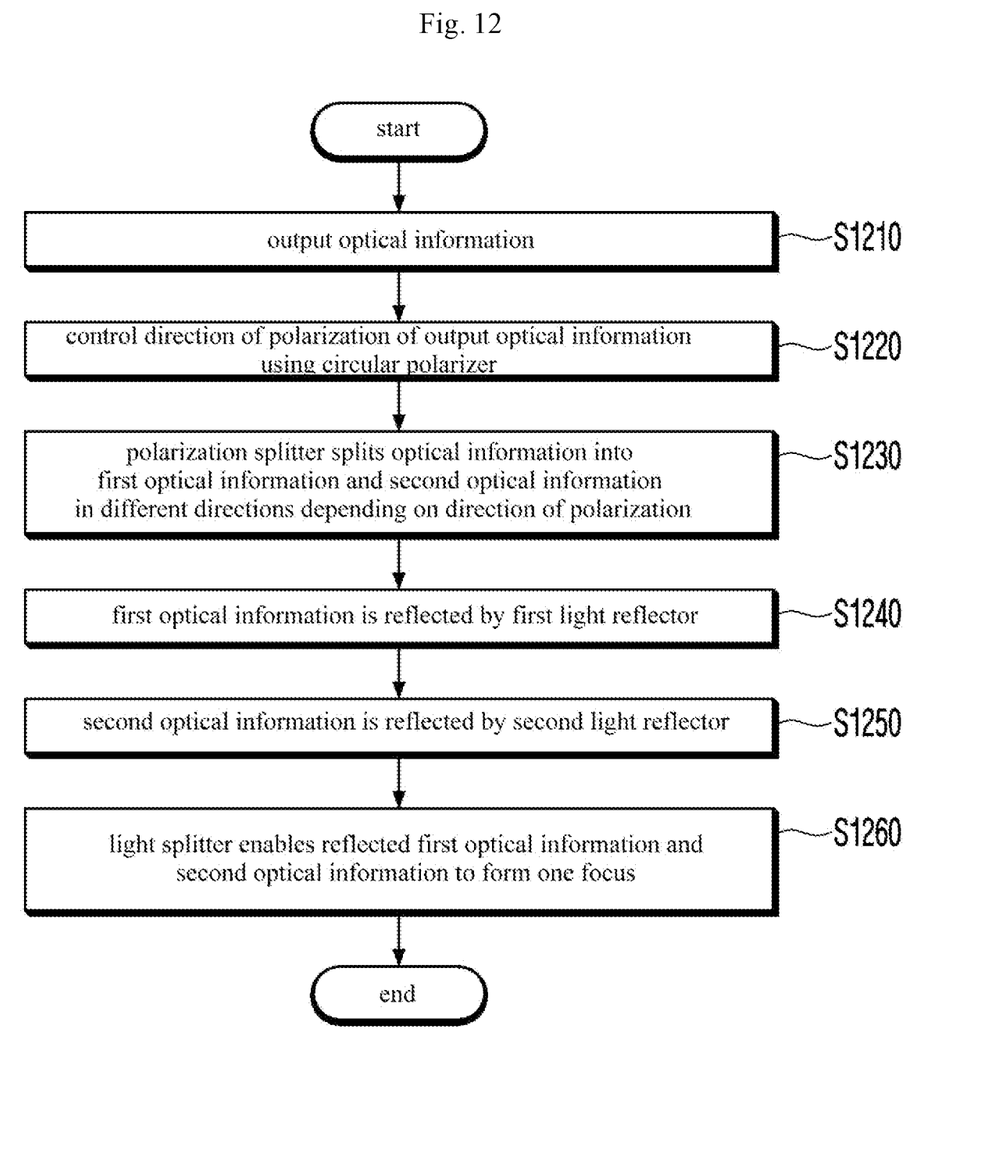
FIG. 12 is a flowchart illustrating a method of producing a multi-focal image by an optical system according to the second embodiment of the disclosure.

FIG. 12 is a flowchart illustrating a method of producing a multi-focal image by an optical system according to the second embodiment of the disclosure.

The image output unit 220 outputs optical information (S1210).

A controller (e.g., the controller 240) controls the direction of polarization of the output optical information using the circular polarizer 410 (S1220).

The optical information is split into first optical information and second optical information in different directions by the polarization splitter 420 depending on the direction of polarization (S1230).

The first optical information is reflected by the first light reflector (S1240).

The second optical information is reflected by the second light reflector (S1250). The materials of the light reflectors 340 and 345 may have different refractive indexes, and the distances between the light splitter 330 and the light reflectors 340 and 345 may differ from each other.

The light splitter 330 enables the reflected first optical information and second optical information to form one focus (S1260).

Although FIGS. 11 and 12 illustrate that the steps are sequentially performed, this merely provides an embodiment of the disclosure. It would readily be appreciated by a skilled artisan that the steps of FIGS. 11 and 12 are not limited to the order shown but may rather be performed in a different order, one or more of the steps may simultaneously be performed, or other various modifications or changes may be made thereto without departing from the scope of the disclosure The above-described steps or processes may be implemented as computer-readable code in a recording medium. The computer-readable recording medium includes all types of recording devices storing data readable by a computer system. The computer-readable recording medium includes a storage medium, such as a magnetic storage medium (e.g., a ROM, a floppy disk, or a hard disk) or an optical reading medium (e.g., a CD-ROM or a DVD). Further, the computer-readable recording medium may be distributed to computer systems connected via a network, and computer-readable codes may be stored and executed in a distributed manner.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:
1. A multi-focal optical device, comprising:
an image output unit outputting optical information;
a linear polarizer uni-directionally polarizing the optical information;
a first light reflector including a first polarizer transmitting light only in a first direction and reflecting the light transmitted through the first polarizer;
a second light reflector including a second polarizer transmitting light only in a second direction perpendicular to the first direction and reflecting the light transmitted through the second polarizer;

a light splitter splitting the optical information transmitted through the linear polarizer into the first light reflector and the second light reflector and reflecting the optical information reflected by one of the first light reflector or the second light reflector to allow the reflected optical information to form one focus; and a controller configured to control the linear polarizer to vary a direction of polarization of the linear polarizer.

2. The multi-focal optical device of claim 1, wherein at least one of the first light reflector or the second light reflector is implemented as a semi-transparent mirror.

3. The multi-focal optical device of claim 2, wherein the first light reflector and the second light reflector are formed of materials with different refractive indexes.

4. The multi-focal optical device of claim 3, wherein the light splitter forms two virtual images with different image forming distances by forming one focus.

5. The multi-focal optical device of claim 2, wherein the first light reflector and the second light reflector are positioned away from the light splitter at different distances.

6. A multi-focal optical device, comprising:
an image output unit outputting optical information;
a circular polarizer circular-polarizing the optical information;
a first light reflector and a second light reflector reflecting incident light;
a light splitter splitting the optical information transmitted through the circular polarizer into the first light reflector or the second light reflector depending on a direction of polarization and reflecting the optical information reflected by one of the first light reflector or the second light reflector to allow the reflected optical information to form one focus; and
a controller configured to control the circular polarizer to vary the direction of polarization of the circular polarizer.

7. The multi-focal optical device of claim 6, wherein at least one of the first light reflector or the second light reflector is implemented as a semi-transparent mirror.

8. The multi-focal optical device of claim 7, wherein the first light reflector and the second light reflector are formed of materials with different refractive indexes.

9. The multi-focal optical device of claim 8, wherein the light splitter forms two virtual images with different image forming distances by forming one focus.

10. The multi-focal optical device of claim 7, wherein the first light reflector and the second light reflector are positioned away from the light splitter at different distances.

* * * * *